(12) United States Patent
Ooka et al.

(10) Patent No.: US 10,358,110 B2
(45) Date of Patent: Jul. 23, 2019

(54) AIRBAG WITH FLOW REGULATOR

(71) Applicant: NIHON PLAST CO., LTD., Fujinomiya-shi, Shizuoka (JP)

(72) Inventors: Masahiro Ooka, Fujinomiya (JP); Yohei Kiuchi, Fujinomiya (JP); Akihiko Yamami, Fujinomiya (JP); Yuta Inaba, Fujinomiya (JP)

(73) Assignee: NIHON PLAST CO., LTD., Fujinomiya-Shi, Shizuoka (JP)

( * ) Notice: Subject to any disclaimer, the term of this patent is extended or adjusted under 35 U.S.C. 154(b) by 64 days.

(21) Appl. No.: 15/640,257

(22) Filed: Jun. 30, 2017

(65) Prior Publication Data
US 2018/0001865 A1 Jan. 4, 2018

(30) Foreign Application Priority Data
Jul. 1, 2016 (JP) .................................. 2016-131868

(51) Int. Cl.
*B60R 21/2346* (2011.01)
*B60R 21/203* (2006.01)
*B60R 21/237* (2006.01)
*B60R 21/26* (2011.01)

(52) U.S. Cl.
CPC ...... *B60R 21/2346* (2013.01); *B60R 21/2035* (2013.01); *B60R 21/237* (2013.01); *B60R 21/26* (2013.01)

(58) Field of Classification Search
CPC .......... B60R 2021/161; B60R 21/2346; B60R 2021/23123; B60R 2021/23324; B60R 21/233

USPC .................................................. 280/742, 740
See application file for complete search history.

(56) References Cited

U.S. PATENT DOCUMENTS

| | | | | |
|---|---|---|---|---|
| 5,492,362 A | * | 2/1996 | Lehman | B60R 21/23 280/739 |
| 5,573,270 A | * | 11/1996 | Sogi | B60R 21/233 280/740 |
| 5,681,052 A | * | 10/1997 | Ricks | B60R 21/237 280/731 |

(Continued)

FOREIGN PATENT DOCUMENTS

| | | | | |
|---|---|---|---|---|
| DE | 2159449 A1 | * | 6/1973 | ............. B60R 21/23 |
| JP | 10-152009 A | | 6/1998 | |

(Continued)

*Primary Examiner* — Ruth Ilan
(74) *Attorney, Agent, or Firm* — Procopio, Cory, Hargreaves & Savitch LLP (57) ABSTRACT

An airbag includes: an airbag body formed in a bag shape with an occupant-side panel facing an occupant and an opposite-side panel facing a steering wheel in a deployed state; and a flow regulator arranged inside the airbag body and configured to regulate a direction of flow of gas supplied from an inflator. The flow regulator includes: a flow-regulator body arranged such that at least part of the flow-regulator body faces the inflator; fixed portions provided at mutually separated positions on the flow-regulator body and fixed to the opposite-side panel; and a notch provided between the fixed portions in a recessed shape toward a center of the flow-regulator body and forming a gas passage port between the notch and the opposite-side panel, the gas passage port being a port through which the gas supplied from the inflator flows.

2 Claims, 11 Drawing Sheets

(56) References Cited

U.S. PATENT DOCUMENTS

| | | | | |
|---|---|---|---|---|
| 5,957,485 A * | 9/1999 | Hirai | ...................... | B60R 21/233 |
| | | | | 280/729 |
| 6,283,499 B1 * | 9/2001 | Nelsen | .................. | B60R 21/233 |
| | | | | 280/729 |
| 6,478,331 B1 * | 11/2002 | Lang | ...................... | B60R 21/233 |
| | | | | 280/729 |
| 6,612,609 B1 * | 9/2003 | Rodriguez | ............ | B60R 21/201 |
| | | | | 280/729 |
| 6,648,366 B2 * | 11/2003 | Dillon | .................. | B60R 21/233 |
| | | | | 280/729 |
| 2002/0113419 A1 * | 8/2002 | Kai | ........................ | B60Q 5/003 |
| | | | | 280/731 |
| 2008/0106085 A1 * | 5/2008 | Yoon | .................... | B60R 21/233 |
| | | | | 280/743.2 |
| 2016/0121840 A1 * | 5/2016 | Iida | ...................... | B60R 21/201 |
| | | | | 280/728.2 |

FOREIGN PATENT DOCUMENTS

| | | | | |
|---|---|---|---|---|
| JP | 2006-008124 A | | 1/2006 | |
| JP | 2011126307 A | * | 6/2011 | ......... B60R 21/2346 |
| JP | 2013-514924 A | | 5/2013 | |
| JP | 5664567 B2 | * | 2/2015 | |
| JP | 6143542 B2 | * | 6/2017 | |
| WO | 2011/079044 A1 | | 6/2011 | |
| WO | WO-2013058329 A1 | * | 4/2013 | ........... B60R 21/239 |

\* cited by examiner

AIRBAG WITH FLOW REGULATOR

CROSS REFERENCE TO RELATED APPLICATION

This application is based upon and claims the benefit of priority from the prior Japanese Patent Application No. 2016-131868, filed on Jul. 1, 2016, the entire contents of which are incorporated herein by reference.

BACKGROUND

1. Technical Field

The disclosure relates to an airbag for a driver's seat used in an airbag device mounted to a steering wheel, for example.

2. Related Art

Airbag devices to be installed in the steering wheel of an automobile have been known. Such an airbag device includes an airbag in a flat bag shape, a cover covering this airbag, an inflator configured to supply gas, and so on. This airbag, in a normal state, is folded in a predetermined way into, a small size and housed inside the cover. When a sensor detects the impact of a collision, this airbag is expanded by being supplied with gas from the inflator. The pressure of this expansion tears the cover, allowing the airbag to project, expand, and, deploy to the front of the occupant and relax the impact applied to the occupant.

Japanese Patent Application Publications Nos. Hei 10-152009 and 2006-8124 and Published Japanese Translation of PCT International Application No. 2013-514924 describe configurations of airbags for use in such an airbag device in which the airbag body of the airbag formed in a bag shape with an occupant-side panel facing the occupant and an opposite-side panel opposite from it, includes an inner panel therein at a position facing the inflator, the inner panel being a flow regulator configured to regulate the direction of flow of gas supplied from the inflator.

In Japanese Patent Application Publication No. Hei 10-152009, the inner panel, which is in a rectangular shape, has its four corners fixed to a substantially center portion of the back-side panel, and guides a jet of gas from the position of each edge of the inner panel toward the outer periphery of the airbag body in a direction substantially perpendicular to the direction toward the occupant.

In Japanese Patent Application Publication No. 2006-8124, the inner-panel, which is in a cross shape or a Y-shape, has its outer edges, excluding the tips, fixed to a substantially center portion of the opposite-side panel to form a cross-shaped or Y-shaped tunnel extending toward the outer periphery of the airbag body, and guides a jet of gas through this tunnel toward the outer periphery.

In Published Japanese Translation of PCT International Application No. 2013-514524, the inner panel, which is in a Y-shape, a straight shape, or a cross shape, has its outer edges, excluding the tips, fixed to a substantially center portion of the opposite-side panel to form a Y-shaped, straight, or cross-shaped tunnel extending toward the outer periphery, a plurality of gas passage openings are formed in the inner panel, and guides a jet of gas through the tunnel and the gas passage openings.

SUMMARY

Meanwhile, in the case of the above configurations, expansion between the occupant-side panel and the opposite-side panel near the center of the airbag body occurs after expansion at the outer periphery of the airbag body. For this reason, there is a need for an additional configuration to restrict the airbag body from entering the opening between the rim and the boss of the steering wheel.

An object of the disclosure is to provide an airbag capable of stabilizing airbag deploying behavior with a simple configuration.

An airbag in accordance with some embodiments includes: a case provided in a boss of a steering wheel including a rim, the boss located inward of the rim, and a spoke connecting the rim and the boss; a cover configured to cover the case; an airbag body formed in a bag shape with an occupant-side panel facing an occupant and an opposite-side panel facing the steering wheel in a deployed state, housed in a folded state between the case and the cover, and configured to deploy toward a front of the occupant by expanding with gas supplied from an inflator and tearing part of the cover; and a flow regulator arranged inside the airbag body and configured to regulate a direction of flow of the gas supplied from the inflator. The flow regulator includes a flow-regulator body arranged such that at least part of the flow-regulator body faces the inflator, fixed portions provided at mutually separated positions on the flow-regulator body and fixed to the opposite-side panel, and a notch provided between the fixed portions in a recessed shape toward a center of the flow-regulator body and forming a gas passage port between the notch and the opposite-side panel, the gas passage port being a port through which the gas supplied from the inflator flows.

According to the above configuration, gas is supplied from the notch toward the occupant-side panel to expand the airbag body toward the occupant relative to the steering wheel at an early stage of the deployment. In this way, the airbag body is restricted from entering the space between the rim and the boss and spoke. Hence, the deploying behavior can be stabilized.

The notch may have a notch depth greater than or equal to a distance from the center of the flow-regulator body to the notch.

According to the above configuration, the notch can be formed deeper. In this way, gas can be supplied more reliably from the notch toward the occupant-side panel.

The notch may be arranged at least on an upper side of the flow-regulator body.

According to the above configuration, the airbag body is restricted from entering the space between the upper side of the boss and the rim. Hence, the deploying behavior can be more reliably stabilized.

The airbag body in the folded state may include first packed portions and second packed portions packed toward a predetermined point and configured to deploy radially toward an outer periphery upon introduction of the gas. The first packed portions may be each folded in a wavy shape along a first fold line in a first predetermined direction. The second packed portions may be each folded in a wavy shape along a second fold line in a second predetermined direction and further folded in a wavy shape along a third fold line in a direction crossing the second fold line, and arranged in a same direction as the notch of the flow regulator.

According to the above configuration, the airbag body is folded in such a state as to include the first packed portions and the second packed portions which are packed toward the predetermined point and configured to deploy radially toward the outer periphery upon introduction of gas, the first packed portions are each folded in a wavy shape along the first fold line in the first predetermined direction, and the second packed portions are each folded in a wavy shape along the second fold line in the second predetermined direction and further folded in a wavy shape along the third fold line in the direction crossing the second fold line. Thus, when gas is introduced into the airbag body, the first packed portions, protruding toward the outer periphery, quickly deploy radially toward the outer periphery, and the second packed portions deploy radially toward the outer periphery. In this way, a deployment characteristic allowing quick expansion and deployment of the entirety of the airbag body toward the outer periphery is easily achieved. Moreover, each of the second packed portions, which are unfolded less easily than the first packed portions, is arranged at the position of the notch to be actively supplied with gas from the gas passage port. In this way, the balance between the unfolding timing of the first packed portions and the unfolding timing of the second packed portions is improved. Hence, more stable deploying behavior can be obtained.

The first predetermined direction may include an upward direction, a downward direction, a leftward direction, and a rightward direction. The second predetermined direction may include an upper left direction, an upper right direction, a lower left direction, and a lower right direction.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Description will be hereinbelow provided for embodiments of the present invention by referring to the drawings. It should be noted that the same or similar parts and components throughout the drawings will be denoted by the same or similar reference signs, and that descriptions for such parts and components will be omitted or simplified. In addition, it should be noted that the drawings are schematic and therefore different from the actual ones.

A first embodiment of the present invention will be described below with reference to drawings.

Figure 1A:
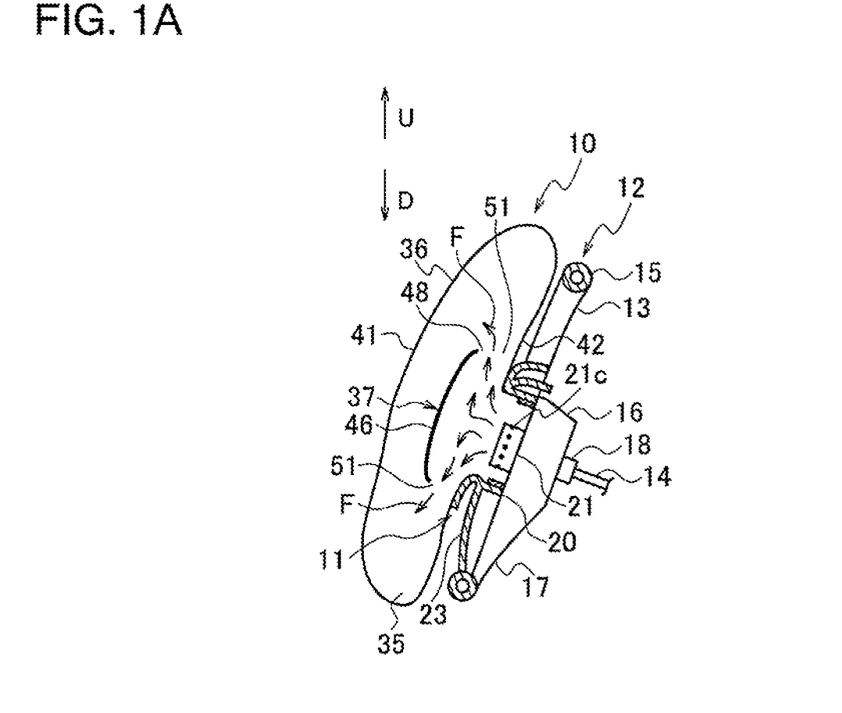
FIG. 1A is a cross-sectional view of a steering wheel with an airbag according to a first embodiment of the present invention deployed.

In FIG. 1A, an airbag 10 according to the first embodiment constitutes an airbag device 11. The airbag device 11 is installed in a steering wheel body 13 which is a member to be mounted of a steering wheel 12 of an automobile, or a vehicle, and is configured to protect an occupant who is a protection target from the impact of a collision. The steering wheel body 13 illustrated in FIG. 4 includes: a rim 15 in the shape of a circular ring as a part to be gripped, also called a grip part or a ring part; a boss 16 located inward of the rim 15; and a plurality of spokes 17 (for example, three spokes on the left, right, and lower sides) connecting the rim 15 and the boss 16 to each other. As illustrated in FIG. 1A, a steering shaft 14 is fitted in and fixed to a boss portion 18 included in the boss 16. Note that although the steering wheel body 13 is normally mounted to a tilted steering shaft 14 and used in a tilted posture, description will be given below assuming that the occupant side where the airbag device 11 is mounted is the front side or top side, the opposite side, specifically the opposite side from the occupant side, is the vehicle body side, rear side, bottom side, or back side, and the vertical, up-down direction is toward the upper side (the direction of arrow U) and the lower side (the direction of arrow D).

Figure 3A:
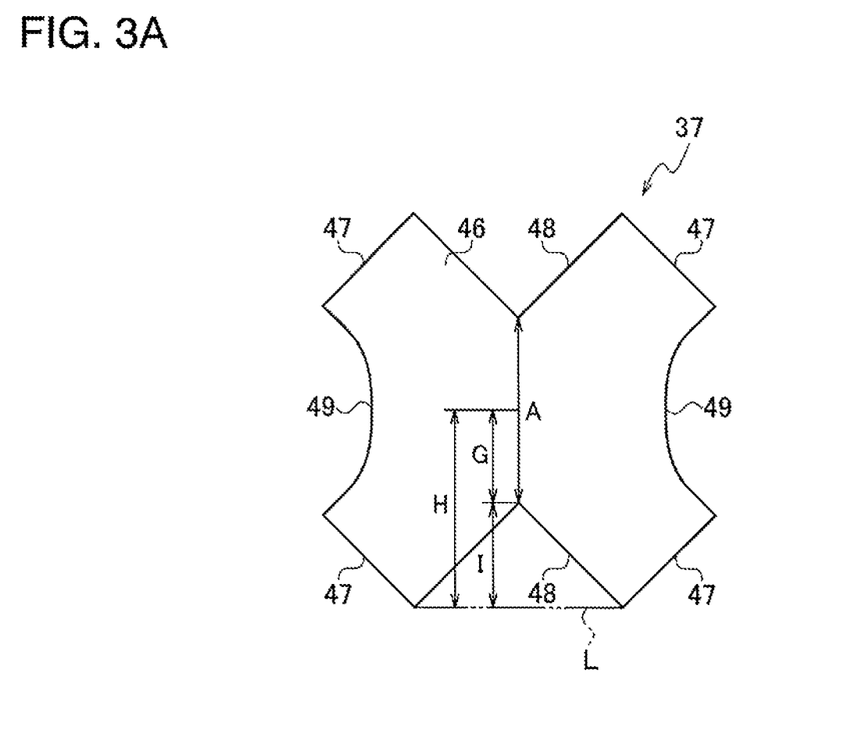
FIG. 3A is a front view schematically illustrating a flow regulator for the airbag according to the first embodiment.
Figure 3B:
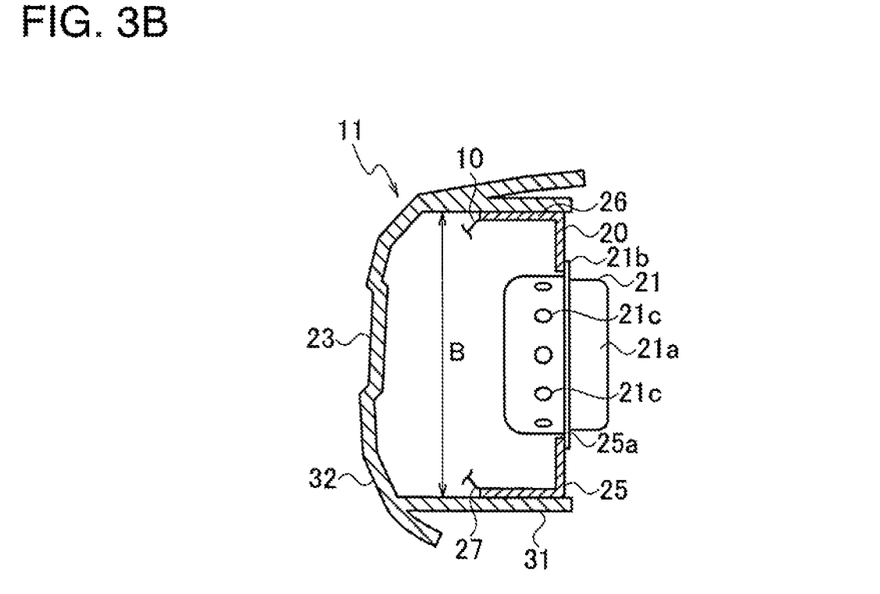
FIG. 3B is a cross-sectional view schematically illustrating an airbag device housing the airbag according to the first embodiment.

The airbag device 11, illustrated in FIG. 3B, is also called an airbag module. The airbag device 11 includes a base plate 20 as a case constituting a support member, the airbag 10, an inflator 21, a retainer (not illustrated), and a cover 23 mounted to the base plate 20, and so on.

The base plate 20 is also called, for example, a back plate and is molded from, for example, a synthetic resin or the like into as a single piece. The base plate 20 includes a bottom 25 as a mount surface to which to mount the inflator 21, and a sidewall 26 rising from the outer edge of the bottom 25 and is formed in a box shape with an opening 27 on the occupant side.

The bottom 25 is provided at its center with an inflator mount opening 25a in the shape of, for example, a circular hole in which to insert the inflator 21. Bolt mount holes not illustrated are formed around the inflator mount opening 25a, for example, at four positions.

The inflator 21 is in a substantially disk shape as a whole. It is shaped and functions in a common manner. The inflator 21 includes a substantially cylindrical inflator body 21a configured to be inserted into the inflator mount opening 25a of the base plate 20, and a plate-shaped mount flange 21*b* protruding from the outer periphery of the inflator body 21*a* and configured to be placed on the bottom 25 of the base plate 20. In the inflator body 21*a*, a plurality of gas injection orifices 21*c* from which to inject gas are arranged radially toward the outer periphery and located forward of the mount flange 21*b*. Bolt mount holes hot illustrated are formed in the mount flange 21*b* at four positions. These bolt mount holes communicate with the bolt mount holes in the base plate 20. A connector at a tip, of a harness is connected to the rear side of the inflator body 21*a*. The inflator 21 is electrically connected through this harness to a control device not illustrated configured to control the operation of the inflator 21.

The retainer is mace of, for example, metal, resin, or the like, and is provided with mount bolts protruding therefrom and configured to be inserted through the bolt mount holes in the base plate 20 and the inflator 21.

The cover 23 is made of, for example, soft synthetic resin or the like. The cover 23 includes a peripheral wall 31 configured to be fixed to the sidewall 26 of the base plate 20, and a covering portion 32 configured to face the opening 27 of the base plate 20 and cover this opening 27. In the back surface of the covering portion 32, a tear line not illustrated is provided in a predetermined pattern as a portion to be torn. The cover 23 can be torn from this tear line by the pressure of expansion of the airbag 10 to form a predetermined door and release the opening 27 therethrough, thereby allowing the airbag 10 to bulge out toward the occupant.

The airbag 10 illustrated in FIG. 1A includes one or more gas chambers configured to expand with introduction of gas thereinto. The airbag 10 in this embodiment includes an airbag body 36 in a circular bag shape including one gas chamber 35 therein, and an inner panel 37 as a flow regulator arranged in the gas chamber 35, which is the inside of the airbag body 36.

The airbag body 36 is formed such that its outer shape in a deployed state is larger than the outer shape of the steering wheel 12 (steering wheel body 13). The airbag body 36 includes an occupant-side panel 41 defining an exterior panel and serving as a surface for restraining the occupant, and an opposite-side panel 42 not facing the occupant and serving as a surface not for restraining the occupant. In addition to the above, the airbag body 36 may include pieces of reinforcing fabric or the like as appropriate. The occupant-side panel 41, the opposite-side panel 42, and the pieces of reinforcing fabric are each made of a ground fabric being a woven fabric of, for example, nylon (nylon 66), and also called, for example, ground fabric, panel, and plate as well.

The occupant-side panel 41 is arranged to face the occupant side. As illustrated in FIG. 2, the occupant-side panel 41 is formed in a simple circular shape. The occupant-side panel 41 has a larger diameter than the steering wheel 12 (steering wheel body 13 (FIG. 1A)). A vent hole 41*a* is bored in the occupant-side panel 41 as necessary. The vent hole 41*a* is intended to force gas in the gas chamber 35 (FIGS. 1A and 1B) out of the airbag 10, that is, to discharge the gas. The vent hole 41*a* may be in the shape of, for example, a circular hole. Also, a plurality of vent holes 41*a* may be provided. Further, the vent hole(s) 41*a* may be arranged symmetrically on the left and right sides. Furthermore, the vent hole(s) 41*a* may be formed such that the size of the opening(s) varies in accordance with the state of expansion and deployment of the airbag body 36.

The opposite-side panel 42 is in a circular shape with an outer diameter substantially equal to that of the occupant-side panel 41. The opposite-side panel 42 includes an inflator mount opening 42*a* formed at the center in the shape of a circular hole, bolt mount holes 42*b* as bag fixing holes located around the inflator mount opening 42*a*, and an inflator mount portion in the shape of a circular ring including these bolt mount holes 42*b* and surrounding the inflator mount opening 42*a*. The opposite-side panel 42 has its outer periphery stitched to the outer periphery of the occupant-side panel 41 along outer periphery joining portions not illustrated to be joined to the occupant-side panel 41. Then, the panels 41 and 42 are turned inside out and define an exterior panel in a flat bag shape.

Each piece of reinforcing fabric reinforces the occupant-side panel 41 and the opposite-side panel 12. These pieces of reinforcing fabric may function to limit the dimension of forward deployment of the airbag body 36 by, for example, connecting the occupant-side panel 41 and the opposite-side panel 42 to each other.

Figure 1B:
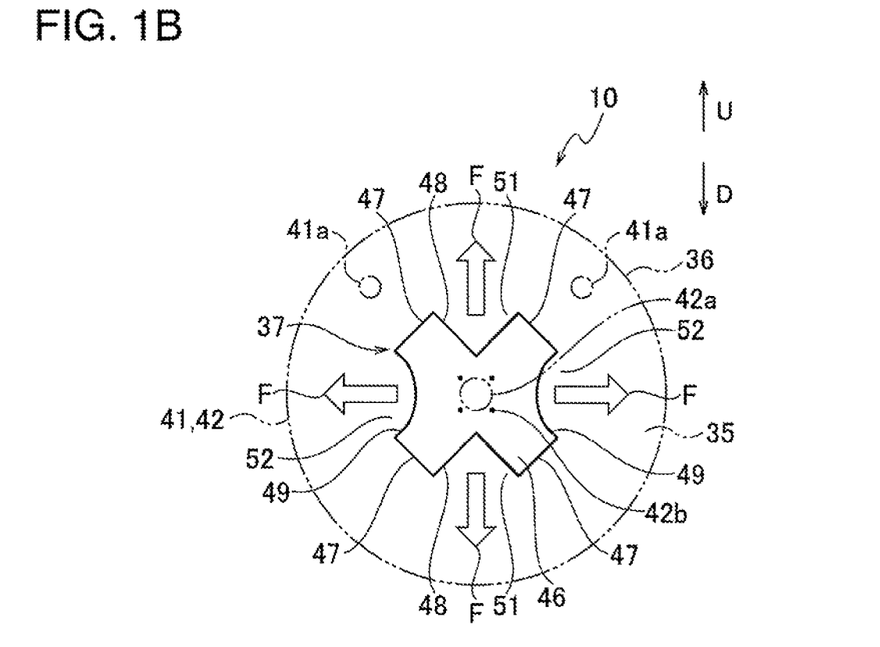
FIG. 1B is a front view schematically illustrating the deployed state of the airbag according to the first embodiment.
Figure 2:
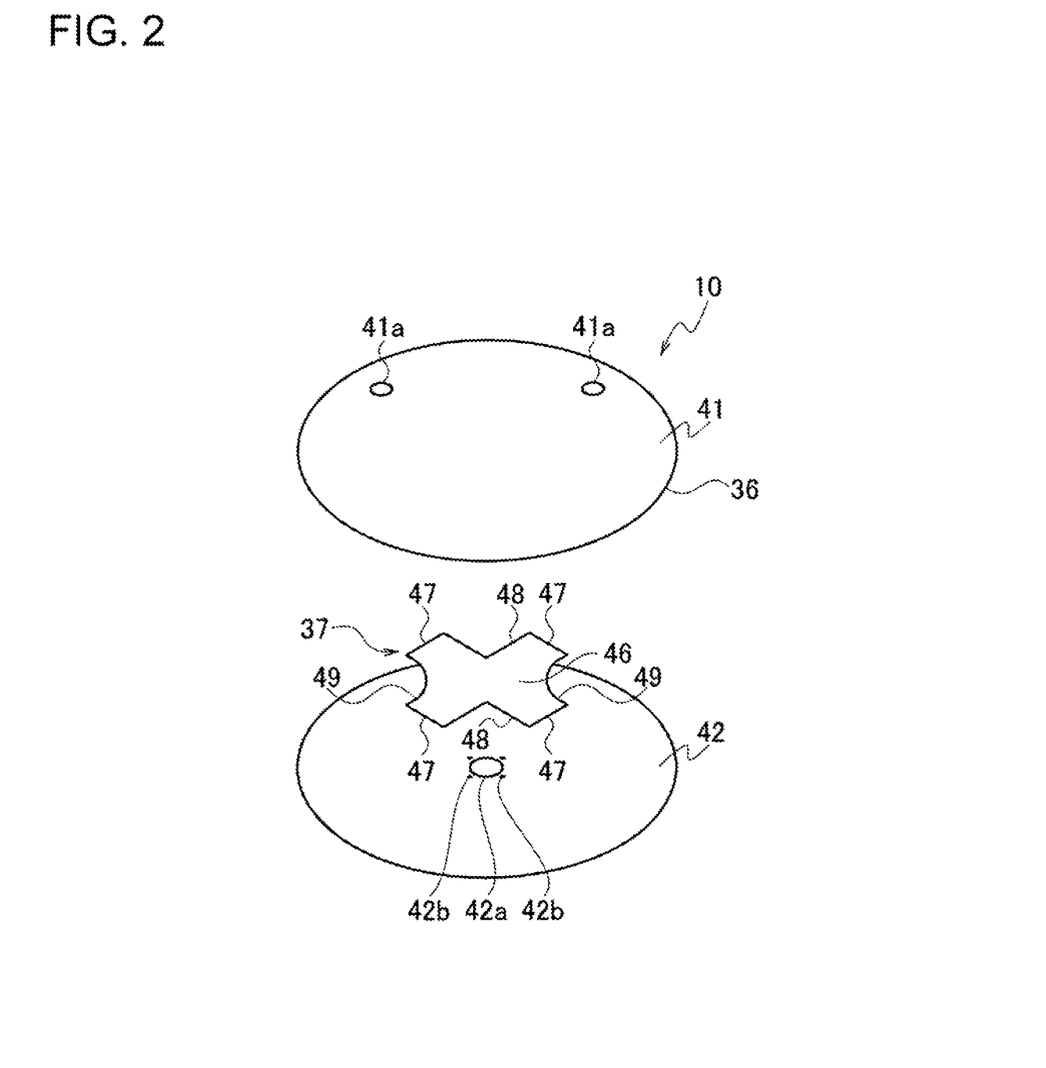
FIG. 2 is an exploded perspective view of the airbag according to the first embodiment.

The inner panel 37 illustrated in FIG. 1B regulates the flow of gas supplied from the inflator 21 (FIG. 1A). The inner panel 37 is made of a ground fabric being a woven fabric of, for example, nylon (nylon 66). The inner panel 37 includes an inner panel body 46 as a flow-regulator body, legs 47 as a plurality of fixed portions protruding from the inner panel body 46, and notches 48 and gas passage portions 49 provided between the legs 47. At the positions of the legs 47, the inner panel 37 is fixed to the opposite-side panel 42 through stitching or the like. At the positions of the notches 48 and the gas passage portions 49, the inner panel 37 is separated from the opposite-side panel 42 to form gas passage ports 51 and 52, respectively, which gas is caused to flow through between the inner panel 37 and the opposite-side panel 42. The inner panel 37 is formed symmetrically in the up-down direction and the left-right direction, for example.

The inner panel body 46 is formed to be smaller than the occupant-side panel 41 and the opposite-side panel 42. As illustrated in FIG. 1A, the inner panel body 46 is arranged such that at least part thereof faces the inflator 21 (face the occupant side of the inflator 21).

Figure 4:
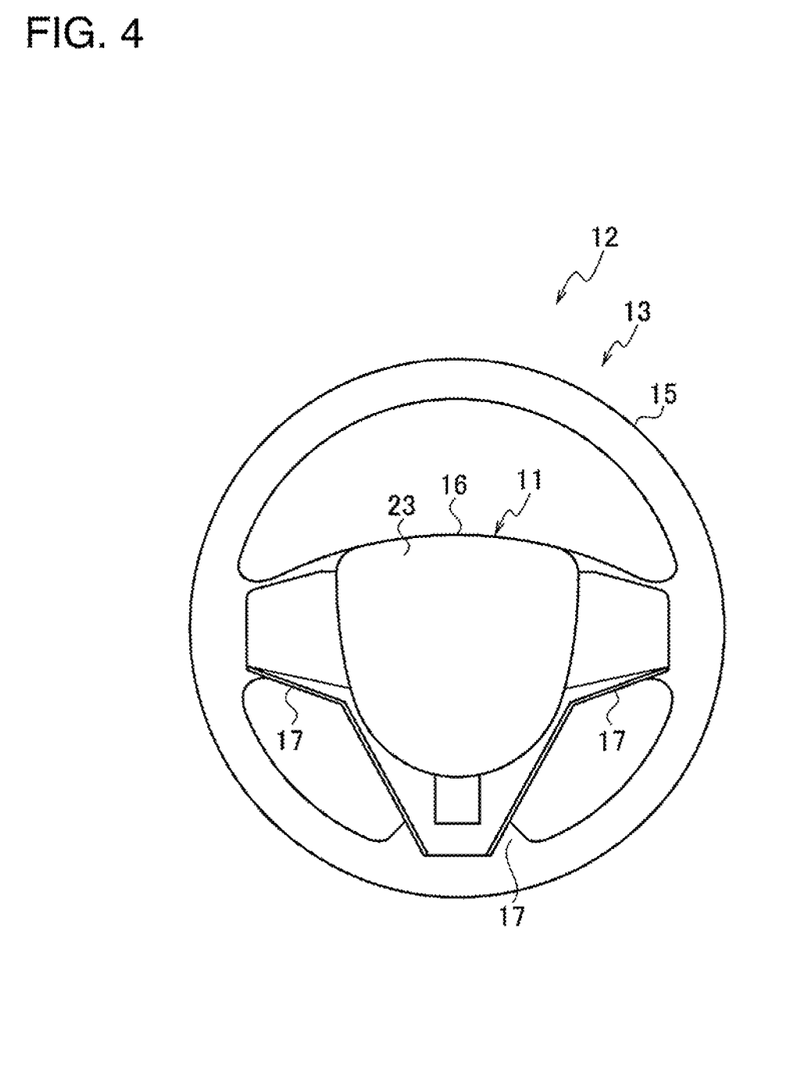
FIG. 4 is a front view illustrating the steering wheel according to the first embodiment.

The legs 47 illustrated in FIG. 1B and FIG. 2 are provided at mutually separated positions on the inner panel body 46. In this embodiment, the legs 47 are provided at four corners of the inner panel body 46 (inner panel 37) and, for example, two legs 47 are provided at the left and right corners on each of the upper and lower sides. That is, these legs 47 are positioned on the upper side and the lower side. Also, as viewed from the center of the inner panel 37 (inner panel body 46), these legs 47 protrude radially in 45° directions toward the left and the right on the upper side and in 45° directions toward the left and the right on the lower side. In other words, these legs 47 are arranged along directions toward the 10:30 position and the 1:30 position and toward the 7:30 position and the 4:30 position of the steering wheel 12 (FIG. 4). These legs 47 are fixed to the opposite-side panel 42 at positions outwardly apart from the inflator mount opening 42*a* and the bolt mount holes 42*b*. Thus, the center position of the inner panel body 46 (inner panel 37) substantially coincides with, the center position of the inflator mount opening 42*a*, which is the center position of the opposite-side panel 42.

The notches 48 regulate the amount of gas flowing into the gas chamber 35 from the gas passage ports 51. The notches 48 are provided in a recessed shape toward the center of the inner panel body 46. In this embodiment, the notches 48 are formed by notching the inner panel body 46 in a V-shape (triangular shape). That is, each notch 48 is in a shape defined by two edges intersecting each other. In other words, each notch 48 is formed to gradually narrow toward the center of the inner panel body 46 (inner panel 37). The notch depth of the notches 48 is so large that they are formed by notching the inner panel body 46 to its center portion, i.e. a position near the inflator 21 (FIG. 1A). In this embodiment, the notches 48 are formed between the legs 47 and 47 located on the left and the right, i.e. between the left and right legs 47 and 47 on the upper side and between the left and right legs 47 and 47 on the lower side, respectively. Thus, in this embodiment, the notches 48 are on the upper side and the lower side of the inner panel 37 (inner panel body 46), which are positions opposite to each other, respectively. In other words, the notches 48 are arranged at the 12 o'clock position and the 6 o'clock position of the steering wheel 12 (FIG. 4). That is, the notches 48 are arranged at a position corresponding to an area surrounded by the left and right spokes 17 and 17, the rim 15, and the boss 16 of the steering wheel 12 illustrated in FIG. 4, and at a position corresponding to the lower spoke 17.

Here, a distance A between these notches 48 illustrated in FIG. 3A, i.e. the width of the inner panel body 46 in the up-down direction at the deepest points of these notches 48, in other words, the remaining portion of the inner panel body 46, is greater than 100% of a length B of the opening 27 of the base plate 20 illustrated in FIG. 3B (case opening length) but less than or equal to a predetermined proportion, e.g. 150% of the length B. That is, in this embodiment, a relation of B<A≤1.5·B is satisfied. Also, a distance G from the center of the inner panel body 46 to the notch 48 is less than or equal to ½ of a distance H from the center of the inner panel body 46 to an imaginary line L connecting the tips of the legs 47. In other words, for each notch 48, a notch depth (cut depth) I (=H−G) is set to be greater than or equal to the distance G from the center of the inner panel body 46 to the notch 48. That is, in this embodiment, a relation of I≥G is satisfied.

Referring back to FIG. 1B, the gas passage portions 49 regulate the amount of gas flowing into the gas chamber 35 from the gas passage ports 52 and are formed by notching the inner panel body 46 in a U-shape. The gas passage portions 49 are provided in a recessed shape toward the center of the inner panel body 46 (inner panel 37). Their notch depth is set to be smaller than that of the notches 48, that is, their notch area is set to be smaller than that of the notches 48. Thus, the flow rate of gas directed (radially) toward the outer edge (outer periphery) of the airbag body 36 is set to be greater for gas flowing into the gas chamber 35 from the gas passage ports 52 than for gas flowing into the gas chamber 35 from the gas passage ports 51. In this embodiment, the gas passage portions 49 are formed between the legs 47 located at the top and the bottom, i.e. between the upper and lower legs 47 on the left side and between the upper and lower legs 47 on the right side, respectively. Thus, in this embodiment, the gas passage portions 49 are arranged on the left side and the right side of the inner panel 37 (inner panel body 46), respectively. In other words, the gas passage portions 49 are arranged at the 9 o'clock position and the 3 o'clock position of the steering wheel 12 (FIG. 4). That is, the gas passage portions 49 are arranged at positions corresponding to the left and right spokes 17 of the steering wheel 12 illustrated in FIG. 4.

With these legs 47, notches 48, and gas passage portions 49, the inner panel body 46 is formed in a substantially X-shape as viewed from the front.

The manufacturing process of the above airbag 10 includes: stitching pieces of reinforcing fabric or the like to the occupant-side panel 41 and the opposite-side panel 42; fixing the legs 47 of the inner panel 37 to the opposite-side panel 42 through stitching or the like; stitching the outer peripheries of the occupant-side panel 41 and the opposite-side panel 42 to each other at the outer periphery joining portions; and pulling the occupant-side panel 41 through the inflator mount opening 42a to turn the occupant-side panel 41 and the opposite-side panel 42 inside out.

To assemble the airbag device 11, first, the retainer is inserted into the gas chamber 35 of the airbag 10, and the mount bolts are inserted through the bolt mount holes 42b from above. Then, the base plate 20, the inflator 21, and the cover 23 are mounted to the airbag 10 to build the airbag device 11. This work is done by: placing the base plate 20 on the lower side of the airbag 10 to insert the mount bolts through the bolt mount holes in the base plate 20; placing the mount flange 21b of the inflator 21 on the rear side of the base plate 20 to insert the mount bolts through the bolt mount holes in this mount flange 21b; and screwing nuts not illustrated onto the mount bolts from their tips and fastening the nuts. In this state, the front side of the inflator body 21a of the inflator 21 is inserted in the airbag 10, that is, the gas injection orifices 21c are positioned inside the gas chamber 35.

Meanwhile, the airbag device 11 is assembled by, before or after the above mounting of the inflator 21, folding the airbag 10 in a predetermined shape such as the shape of flow petals, and laying the cover 23 thereon and fitting the cover 23 from above. Then, the airbag device 11 is mounted to the steering wheel 12 by fixing a mount piece provided to the base plate 20 to the metal core of the boss 16 of the steering wheel body 13 with bolts or the like.

When the impact of a collision is applied to an automobile equipped with the airbag device 11, the inflator 21 is activated by the control device not illustrated, so that gas is quickly injected from the gas injection orifices 21c of the inflator 21 into the gas chamber 35 in the airbag body 36 of the airbag 10. This injected gas hits the inner panel body 46 of the inner panel 37, which is facing the inflator 21, so that the direction of the gas is regulated. The gas is therefore supplied in the upward and downward directions from the upper and lower gas passage ports 51 and in the leftward and rightward directions from the left and right gas passage ports 52 into the gas chamber 35 respectively (the flows F in FIG. 1B). Here, the notches 48, which define the gas passage ports 51, have been notched relatively deep, so that a large amount of gas is injected and flows through these gas passage ports 51 toward the occupant-side panel 41 from positions near the center of the inner panel 37 (inner panel body 46), thereby expanding the airbag body 36 in the front-rear direction (the flows F in FIG. 1A). This restricts the airbag 10 (airbag body 36) from expanding in such a way as to enter the space between the rim 15 and the boss 16 and left and right spokes 17. Then, the airbag 10 exerts the pressure of the expansion on the tear line in the cover 23, thereby tearing the cover 23 (covering portion 32) in a door shape along the tear line, forming a projection opening, and bulging out through this projection opening. As a result, the airbag 10 bulges out into a predetermined shape to the front of the occupant.

Thereafter, the occupant-side panel 41 of the deployed airbag 10 (airbag body 36) receives and restrains the occupant hurled forward, thereby relaxing the impact applied to the occupant.

As described above, according to this embodiment, the plurality of legs 47, which are to be fixed to the opposite-side panel 42, are provided at mutually separated positions on the inner panel body 46, at least part of which faces the inflator 21, of the inner panel 37, which is arranged inside the airbag body 36. Between these legs 47, the notches 48 are provided in a recessed shape toward the center of the inner panel body 46, the notches 48 forming the gas passage ports 51, from which gas flows out, between the notches 48 and the opposite-side panel 42. Thus, gas is supplied from the notches 48 toward the occupant-side panel 41, thereby allowing, at an early stage of the deployment, the airbag body 36 to expand to the occupant side relative to the steering wheel 12 (steering wheel body 13) and restricting the airbag body 36 from entering the space between the rim 15 and the boss 16 and spokes 17. Hence, the deploying behavior and the occupant restraining performance can be stabilized.

Further, the notch depth I of each notch 48 is set to be greater than or equal to the distance G from the center of the inner panel body 46 to the notch 48. In this way, the notch 48 can be formed deeper, thereby allowing more reliable supply of gas from the notch 48 toward the occupant-side panel 41.

That is, by adjusting the notch depth of each notch 48, the degree of expansion of the airbag 10 (airbag body 36) in the front-rear direction at an early stage of the deployment can be controlled. Thus, a desired deployment characteristic can be easily set according to the shape of the steering wheel 12 (steering wheel body 13) and the airbag 10.

On the steering wheel 12, the spokes 17 are not usually arranged on the upper side in order to ensure visibility of meters and gauges, and a large opening is formed between the upper side of the boss 16 and the rim 15. Thus, the airbag body 36 can easily enter this opening during deployment. For this reason, a notch 43 is arranged at least on the upper side of the inner panel body 46. In this way, the airbag body 36 is restricted from entering the opening between the upper side of the boss 16 and the rim 15, which the airbag body 36 could particularly easily enter. Hence, the deploying behavior can be more reliably stabilized.

Figure 5:
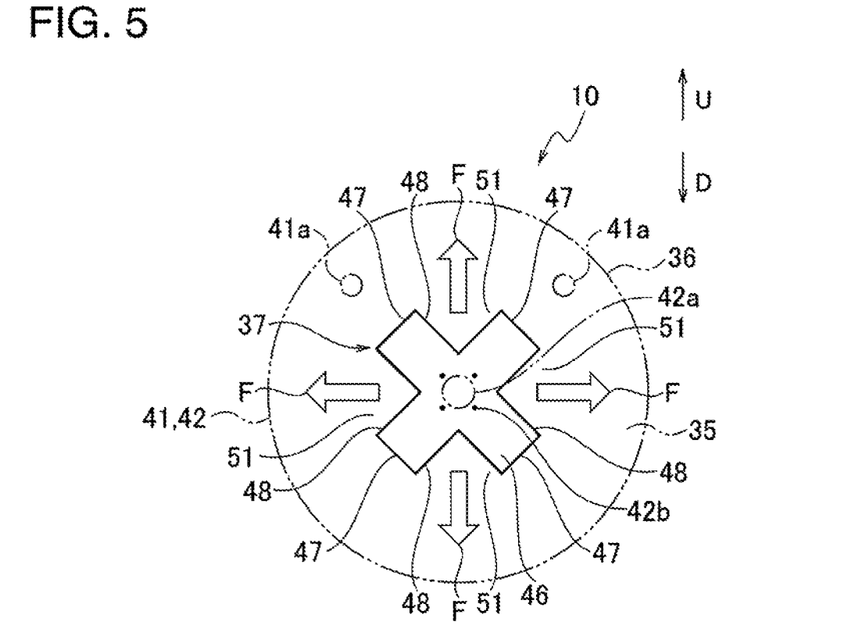
FIG. 5 is a front view schematically illustrating a deployed state of an airbag according to a second embodiment of the present invention.

Note that the gas passage portions 49 in the first embodiment may be replaced with notches 48, as in a second embodiment illustrated in FIG. 5. That is, the inner panel 37 may be provided with notches 48 also between the upper and lower legs 47 located on the left and the right. In this case, the notches 48 (gas passage ports 51) are set on the upper, lower, left, and right sides of the inner panel 37.

Figure 6:
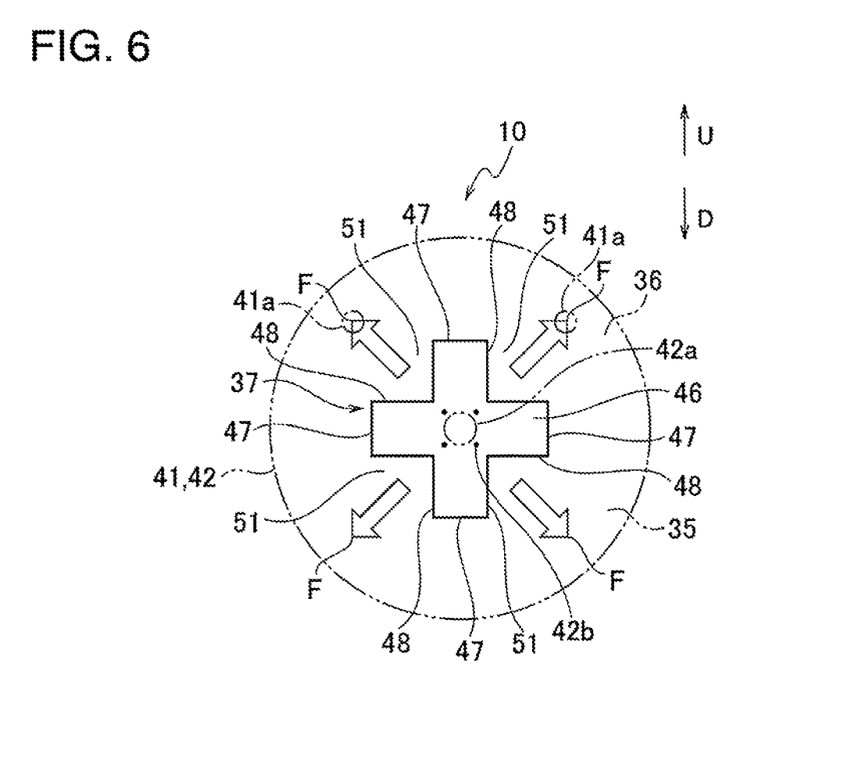
FIG. 6 is a front view schematically illustrating a deployed state of an airbag according to a third embodiment of the present invention.

Also, in the first and second embodiments, the inner panel 37 is arranged to inject gas in upward, downward, leftward, and rightward directions (crisscross directions). However, as in a third embodiment illustrated in FIG. 6, the inner panel 37 may be arranged rotated 45° in the circumferential direction of the steering wheel 12, so that the notches 48 (gas passage ports 51) are set diagonally along upper left and right directions and lower left and right directions (X directions).

As described above, by simply arranging the inner panel 37 with the notches 48 (gas passage ports 51) oriented according to the desired direction of deployment, the deployment of the airbag 10 (airbag body 36) in the desired direction can be sped up easily.

Figure 7A:
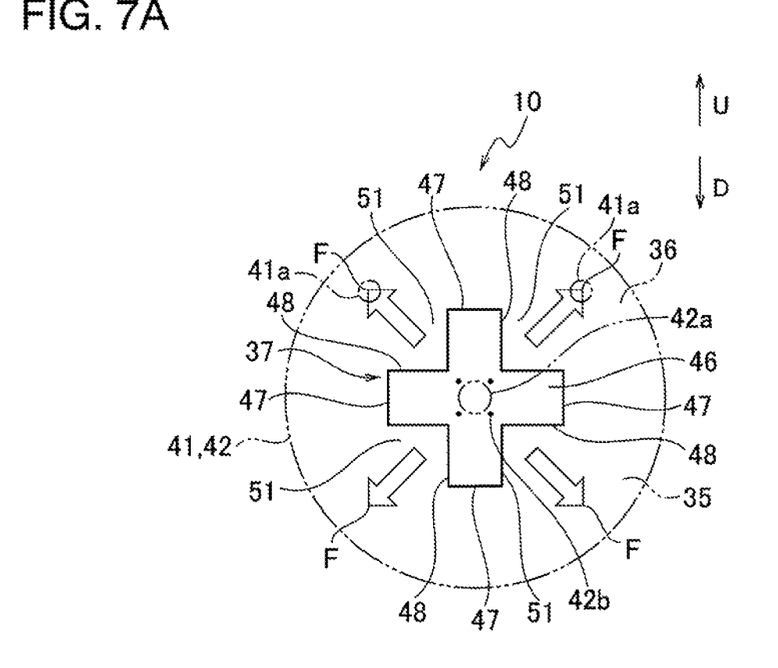
FIG. 7A is a front view schematically illustrating a deployed state of an airbag according to a fourth embodiment of the present invention.

Next, a fourth embodiment will be described with reference FIGS. 7A and 7B and FIG. 8. Note that similar components and operations to the first to third embodiments will be denoted by the same reference signs, and description thereof will be omitted.

An airbag 10 according to the fourth embodiment is the airbag 10 (airbag body 36) in the third embodiment folded by a predetermined folding method.

Figure 7B:
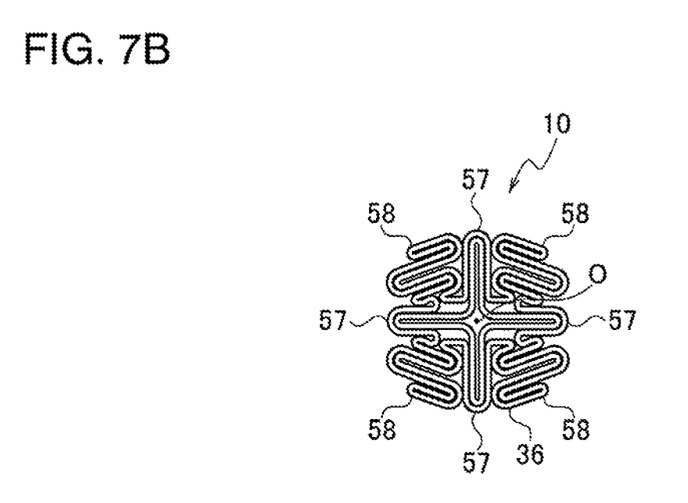
FIG. 7B is a front view schematically illustrating a folded state of the airbag according to the fourth embodiment.
Figure 8:
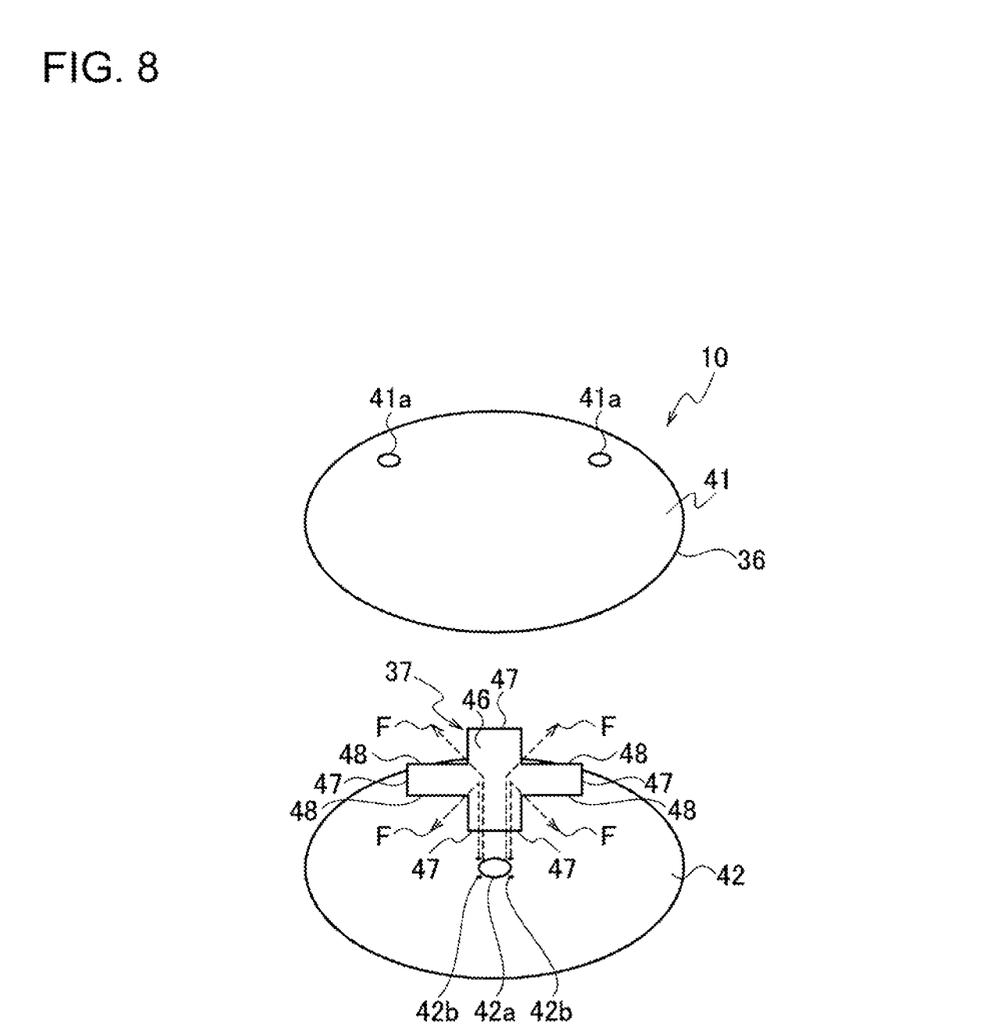
FIG. 8 is an exploded perspective view of the airbag according to the fourth embodiment.

As illustrated in FIG. 7B, on this folded airbag 10, four first packed portions 57 and four second packed portions 58 are arranged around a predetermined point O located around the center. The first packed portions 57 are positioned on the upper, lower, left, and right sides and are, as one may say, single-folded in a wavy shape. Further, the second packed portions 58 are positioned between these first packed portions 57 and are, as one may say, double-folded (accordion-folded) in a wavy shape.

At each first packed portion 57, the occupant-side panel 41 and the opposite-side panel 42 are formed in such a way as not to interlock with each other. At each second packed portion 58, an imaginary line along which the occupant-side panel 41 and the opposite-side panel 42 do not interlock with each other is formed from the center to the outer edge of the airbag 10 along the portion folded in the wavy shape.

Also, in this embodiment, the second packed portions 58 are arranged along the same directions as the notches 48 of the inner panel 37 (FIG. 7A), i.e. diagonally along the upper left and right directions and the lower left and right directions. That is, the first packed portions 57 are arranged crisscross (radially) along the upward, downward, leftward, and rightward directions, and the second packed portions 58 are arranged between these first packed portions 57 diagonally along the upper left and right directions and the lower left and right directions.

Using a well-known folding device, this folding of the airbag 10 (airbag body 36) can be implemented easily and inexpensively by, for example: spreading the bag-shaped airbag body 36 into a flat shape; packing this spread airbag body 36 at a plurality of spots (four spots) from the outer peripheral side toward the predetermined point O; forming the plurality of first packed portions 57, surrounding the predetermined point O and folded in a wavy shape; forming, between these first packed portions 57, a plurality of radially extending portions folded in a wavy shape continuously from the first packed portions 57 and extending radially toward the outer periphery; packing each radially extending portion toward the predetermined point O; and further folding the radially extending portion along fold lines with their directions oriented to cross the direction of the fold lines of the first packed portions 57, thereby forming the second packed portions 58.

Consequently, each first packed portion 57 is folded in a wavy shape along a first fold line in a first predetermined direction (upward, downward, leftward, or rightward direction), and each second packed portion 58 is folded in a wavy shape along second fold lines in a second predetermined direction (diagonally in the upper left or right direction or the lower left or right direction) and further folded in a wavy shape along third fold lines in a direction crossing (or perpendicular to) the second fold lines.

When the inflator 21 is activated by the control device, gas is quickly injected from the gas injection orifices 21c of the inflator 21 into the gas chamber 35 in the airbag body 36 of the airbag 10. This gas hits the inner panel body 46 of the inner panel 37, which is facing the inflator 21, so that the direction of the gas is regulated. The gas is therefore supplied diagonally in the upper left and right directions and the lower left and right directions from the gas passage ports 51, which are located on the upper left and right sides and the lower left and right sides, into the gas chamber 35, respectively. As a result, the first packed portions 57 and the second packed portions 58 of the airbag body 36 are deployed. Here, the first packed portions 57 protrude toward the outer periphery without overlapping the other folded portions and are also single-folded in a wavy shape, thus quickly deploying radially toward the outer periphery while hardly receiving resistance. On the other hand, the second packed portions 58, which are double-folded in a wavy shape, sequentially expand and deploy from the predetermined point O at the center. With this taken into account, in this embodiment, the second packed portions 58 are arranged along the same directions as the notches 48 of the inner panel 37. This allows the gas to be supplied more quickly to the second packed portions 58, which are arranged at positions coinciding with the positions of the notches 48, than to the first packed portions 57, thereby speeding up the deployment of the second packed portions 58 and supplying the gas smoothly to the outer edges. Consequently, each second packed portion 58 deploys with only a short time lag relative to the first packed portions 57.

As described above, the airbag body 36 is folded into such a state as to include the plurality of first packed portions 57 and the plurality of second packed portions 58, which are packed toward the predetermined point O and configured to deploy radially toward the outer periphery upon introduction of gas, the first packed portions 57 are each folded in a wavy shape along the first fold line in the first predetermined direction, and the second packed portions 58 are each folded in a wavy shape along the second fold lines in the second predetermined direction and further folded in a wavy shape along the third fold lines in the direction perpendicular to the second fold lines. In this way, when gas is introduced into the airbag body 36, the first packed portions 57, protruding toward the outer periphery, quickly deploy radially toward the outer periphery, and the second packed portions 58 deploy radially toward the outer periphery. Hence, a preferred deployment characteristic allowing quick expansion and deployment of the entirety of the airbag body 36 toward the outer periphery is easily achieved. Also, the second packed portions 58, which are unfolded less easily than the first packed portions 57, are arranged at the positions of the notches 48 to be actively supplied with gas from the gas passage ports 51. In this way, the balance between the unfolding timing of the first packed portions 57 and the unfolding timing of the second packed portions 58 is improved. Hence, more stable deploying behavior can be obtained.

Consequently, as in the first to third embodiments, the airbag body 36 during deployment is unlikely to enter the space between the rim 15 and the boss 16 and spokes 17. In addition to this, the airbag body 36 can be deployed toward the outer periphery at early timing. Hence, the deployment is less likely to injure the occupant.

Moreover, the first packed portions 57 are formed in such a way as to easily deploy quickly toward the outer periphery by being pressed with the second packed portions 58 and protruding radially toward the outer periphery. In this way, the folding process can be easily simplified and folding with an automated machine is possible. Hence, the manufacturing cost can be reduced.

Next, a fifth embodiment will be described with reference to FIG. 9A to FIG. 11D. Note that similar components and operations to the first to fourth embodiments will be denoted by the same reference signs, and description thereof will be omitted.

An airbag 10 according to the fifth embodiment is the airbag 10 (airbag body 36) in the second embodiment folded by a folding method similar to that in the fourth embodiment.

Figure 9A:
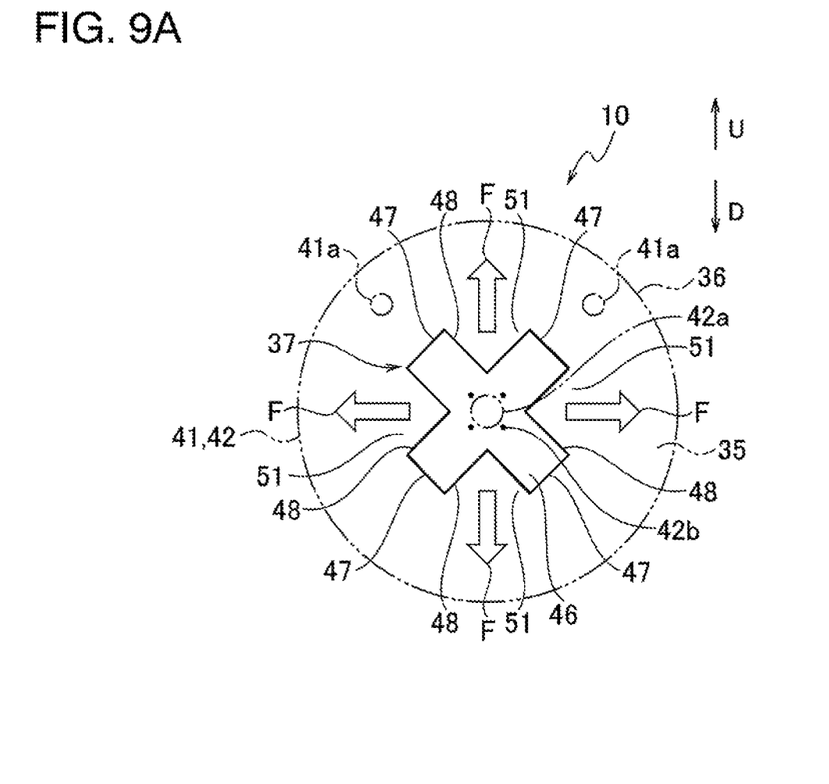
FIG. 9A is a front view schematically illustrating a deployed state of an airbag according to a fifth embodiment of the present invention.
Figure 9B:
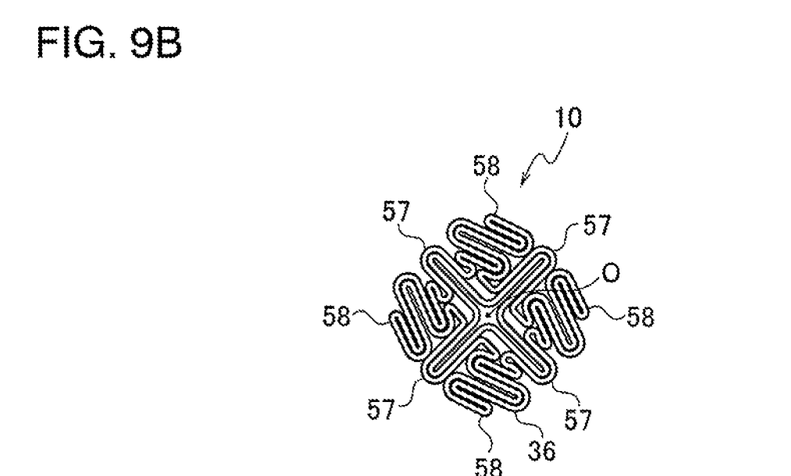
FIG. 9B is a front view schematically illustrating a folded state of the airbag according to the fifth embodiment.
Figure 10:
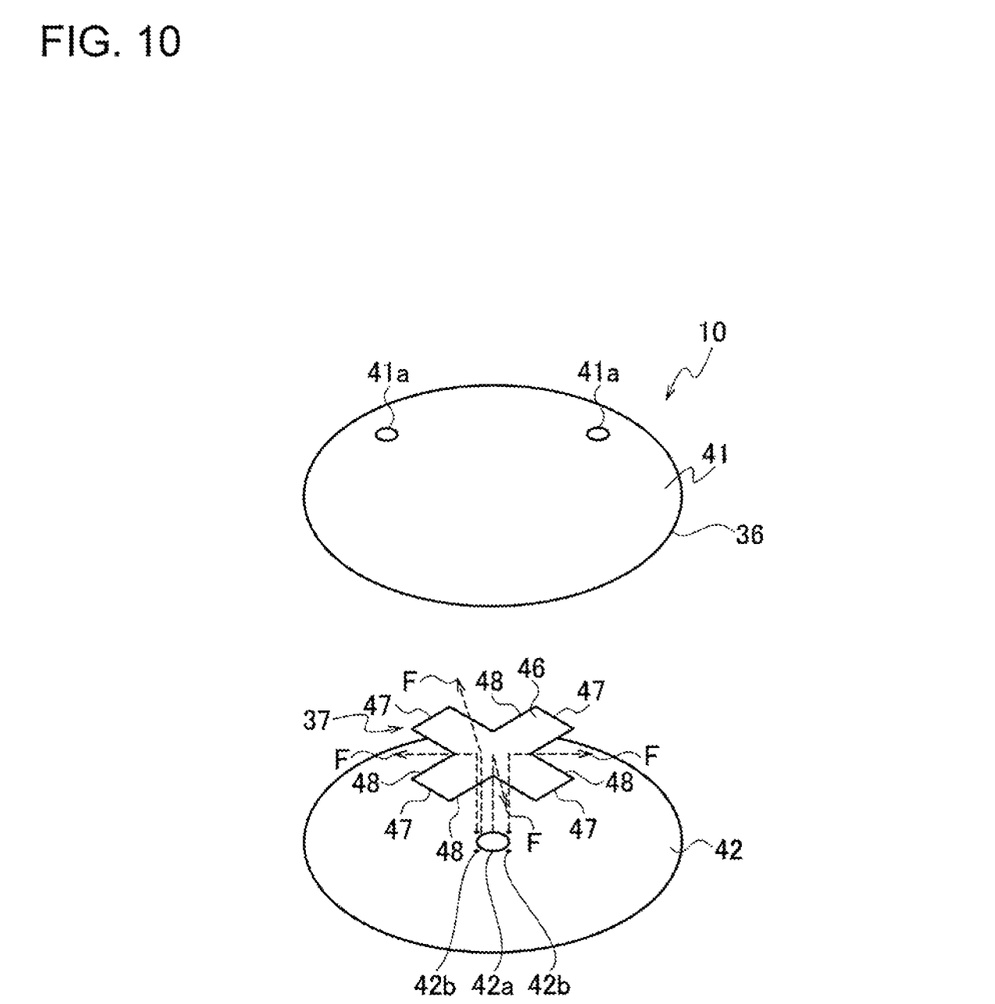
FIG. 10 is an exploded perspective view of the airbag according to, the fifth embodiment.
Figure 11A:
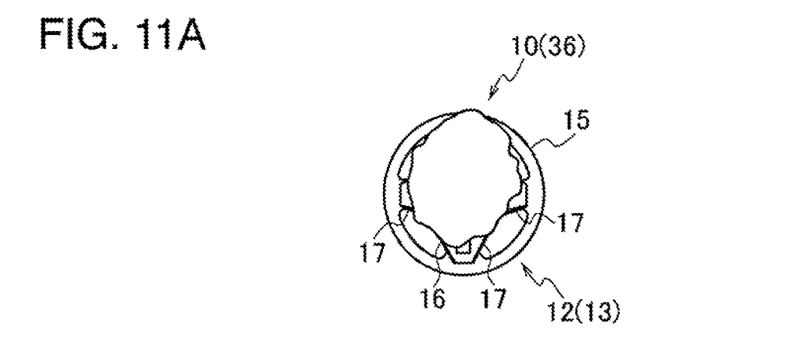
FIGS. 11A to 11D are front views sequentially illustrating deploying behavior of the airbag according to the first embodiment.
Figure 11B:
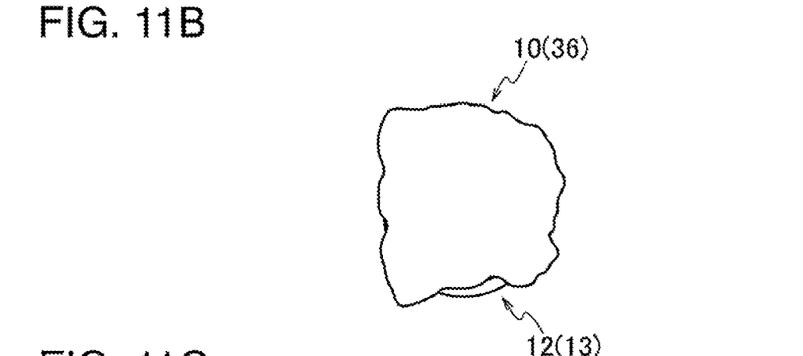
Figure 11C:
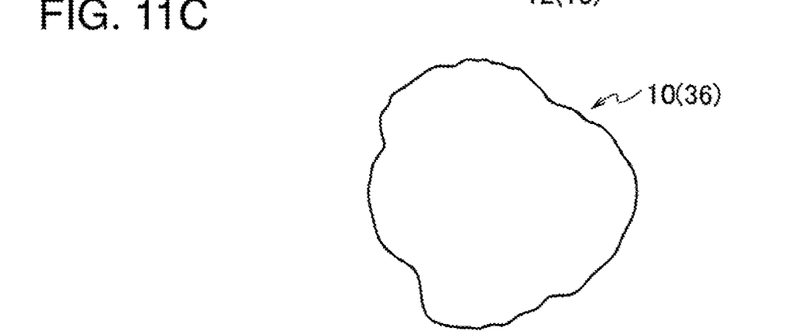
Figure 11D:
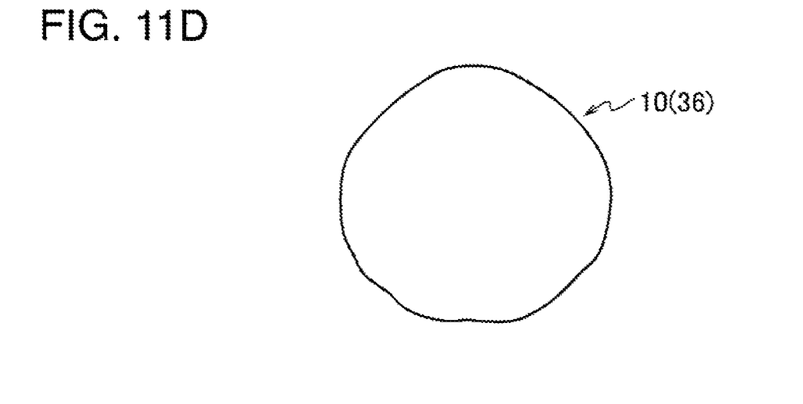
Figure 12A:
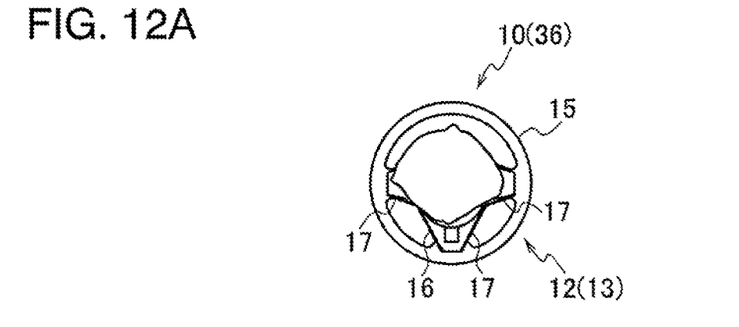
FIGS. 12A to 12D are front views sequentially illustrating deploying behavior of an airbag in a comparative example.
Figure 12B:
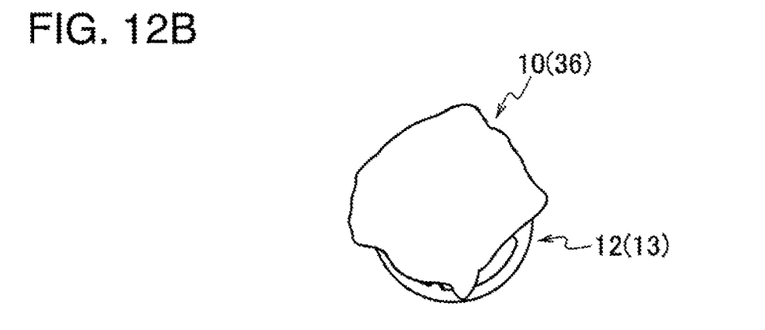
Figure 12C:
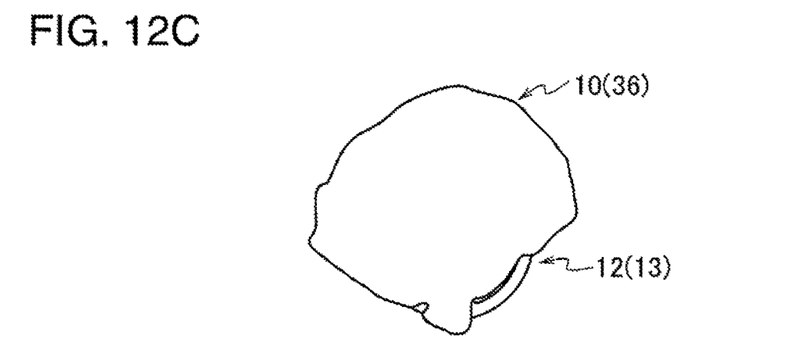
Figure 12D:
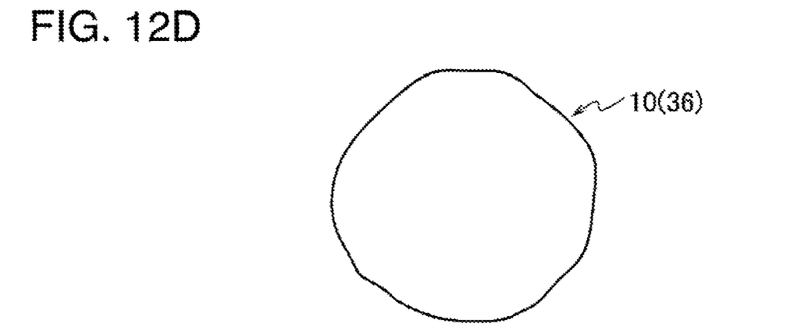

Also, in this embodiment, the second packed portions 58 are arranged along the same directions as the notches 48 of the inner panel 37 (FIG. 9A), i.e. the upward, downward, leftward, and rightward directions. That is, the first packed portions 57 are arranged in an X-shape (radially) diagonally along the upper left and right directions and the lower left and right directions (diagonally 45°), and the second packed portions 58 are arranged between these first packed portions 57 along the upward, downward, leftward, and rightward directions (FIG. 9B).

When the inflator 21 is activated by the control device, gas is quickly injected from the gas injection orifices 21c of the inflator 21 into the gas chamber 35 in the airbag body 36 of the airbag 10. This gas hits the inner panel body 46 of the inner panel 37, which is facing the inflator 21, so that the direction of the gas is regulated. The gas is therefore supplied in the upward, downward, leftward, and rightward directions from the upper, lower, left, and right gas passage ports 51 into the gas chamber 35, respectively. Here, the first packed portions 57 protrude toward the outer periphery without overlapping the other folded portions and are also single-folded in a wavy shape, thus quickly deploying radially toward the outer periphery while hardly receiving resistance. On the other hand, the second packed portions 58, which are double-folded in a wavy shape, sequentially expand and deploy from the predetermined point O at the center. With this taken into account, in this embodiment, the second packed portions 58 are arranged along the same directions as the notches 48 of the inner panel 37. This allows the gas to be supplied more quickly to the second packed portions 58, which are arranged at positions coinciding with the positions of the notches 48, than to the first packed portions 57, thereby speeding up the deployment of the second packed portions 58 and supplying the gas smoothly to the outer edges. Consequently, each second packed portion 58 deploys with only a short time lag relative to the first packed portions 57. Hence, advantageous effects similar to those in the fourth embodiment can be achieved.

FIG. 11A to FIG. 11D schematically illustrate an example of the deploying behavior of the airbag 10 (airbag body 36) in this embodiment. As a comparative example, FIG. 12A to FIG. 12D schematically illustrate an example of the deploying behavior of the airbag 10 (airbag body 36) with the positions of the second packed portions 58 of the inner panel 37 shifted from the positions of the notches 48 to upper left and right positions and lower left and right positions. In FIG. 12A to FIG. 12D, the reference numerals used in the embodiments are used to facilitate understanding. Note that FIGS. 11A to 11D and FIGS. 12A to 12D illustrate states, for example, 8 msec (millisecond), 12 msec, 16 msec, and 36 msec after the start of expansion, respectively. In this embodiment, as compared to the comparative example, the airbag 10 (airbag body 36) deploys quickly not only diagonally in the upper left and right directions and the lower left and right directions, along which are positioned the first packed portions 57, which deploy more easily than the second packed portions 58, but also in the upward, downward, leftward, and rightward directions, along which are positioned the second packed portions 58, which deploy with a time lag relative to the first packed portions 57. Hence, the airbag 10 (airbag body 36) deploys into a rectangular shape evenly over the steering wheel 12 (steering wheel body 13) and is therefore is less likely to be caught on the rim 15.

Note that in the first to fifth embodiments, the inner panel 37 may, for example, have a straight shape with legs 47 on the left and right sides and notches 48 on the upper and lower sides, which are situated between these legs 47, a Y-shape with legs 47 at three positions separated from each other in the circumferential direction and notches 48 between these legs 47.

Also, the positions of the notches 48 may be optionally set according to the shape of the steering wheel 12 (steering wheel body 13) to speed up deployment of the airbag 10 (airbag body 36) in necessary directions at an early stage of the deployment.

Embodiments of the present invention have been described above. However, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

Moreover, the effects described in the embodiments of the present invention are only a list of optimum effects achieved by the present invention. Hence, the effects of the present invention are not limited to those described in the embodiment of the present invention.

What is claimed is:

1. An airbag comprising:
    a case provided in a boss of a steering wheel including a rim, the boss located inward of the rim, and a spoke connecting the rim and the boss;
    a cover configured to cover the case;
    an airbag body formed in a bag shape with an occupant-side panel facing an occupant and an opposite-side panel facing the steering wheel in a deployed state, housed in a folded state between the case and the cover, and configured to deploy toward a front of the occupant by expanding with gas supplied from an inflator and tearing apart the cover; and
    a flow regulator arranged inside the airbag body and configured to regulate a direction of flow of the gas supplied from the inflator, wherein the flow regulator comprises:
        a flow-regulator body arranged such that at least part of the flow-regulator body faces the inflator,
        fixed portions provided at mutually separated positions on the flow-regulator body and fixed to the opposite-side panel, and
        a notch provided between the fixed portions in a recessed shape toward a center of the flow-regulator body and forming a gas passage port between the notch and the opposite-side panel, the gas passage port being a port through which the gas supplied from the inflator flows,
    the airbag body in the folded state comprises first packed portions and second packed portions packed toward a predetermined point and configured to deploy radially toward an outer periphery upon introduction of the gas,
    the first packed portions are each folded in a wavy shape along a first fold line in a first predetermined direction, and
    the second packed portions are each folded in a wavy shape along a second fold line in a second predetermined direction and further folded in a wavy shape along a third fold line in a direction crossing the second fold line, and arranged in a same direction as the notch of the flow regulator.

2. The airbag according to claim 1, wherein
    the first predetermined direction includes an upward direction, a downward direction, a leftward direction, and a rightward direction, and
    the second predetermined direction includes an upper left direction, an upper right direction, a lower left direction, and a lower right direction.

* * * * *